US005455509A

United States Patent [19]

Semura et al.

[11] Patent Number: 5,455,509

[45] Date of Patent: Oct. 3, 1995

[54] DEVICE FOR MOUNTING POSITION DETECTING SENSOR

[75] Inventors: Yasuki Semura; Nobuyuki Nagahashi; Hiroshi Ando, all of Atsugi, Japan

[73] Assignees: Kabushiki Kaisha Komatsu Seisakusho; Komatsu Zenoah Kabushiki Kaisha, both of Tokyo, Japan

[21] Appl. No.: 39,355

[22] PCT Filed: Oct. 21, 1991

[86] PCT No.: PCT/JP91/01442

§ 371 Date: Apr. 22, 1993

§ 102(e) Date: Apr. 22, 1993

[87] PCT Pub. No.: WO92/08058

PCT Pub. Date: May 14, 1992

[30] Foreign Application Priority Data

| | | | |
|---|---|---|---|
| Oct. 26, 1990 | [JP] | Japan | 2-111650 |
| Oct. 30, 1990 | [JP] | Japan | 2-113083 |
| Nov. 19, 1990 | [JP] | Japan | 2-120315 |
| Nov. 30, 1990 | [JP] | Japan | 2-126734 |

[51] Int. Cl.[6] ........ F15B 15/28; G01B 7/00

[52] U.S. Cl. ........ 324/207.24; 73/866.5; 92/5 R; 92/5 L

[58] Field of Search ........ 324/207.15, 207.22, 324/207.24, 207.26; 73/866.5; 137/554; 92/5 L, 5 R

[56] References Cited

U.S. PATENT DOCUMENTS

| | | | |
|---|---|---|---|
| 2,967,513 | 1/1961 | Chace | 92/5 L |
| 4,471,304 | 9/1984 | Wolf | 324/251 X |
| 4,726,282 | 2/1988 | La Bair | 92/5 R |
| 4,838,146 | 6/1989 | Stoll | 92/5 R |
| 4,839,591 | 6/1989 | Nomura et al. | 92/5 R X |
| 5,138,934 | 8/1992 | Murayama et al. | 92/5 R |
| 5,211,102 | 5/1993 | Muta | 92/208 |
| 5,280,238 | 1/1994 | Tsuchiya et al. | 324/207.24 |
| 5,325,734 | 7/1994 | Jordan | 324/207.25 X |

FOREIGN PATENT DOCUMENTS

| | | | |
|---|---|---|---|
| 309304 | 3/1989 | European Pat. Off. | 92/5 R |
| 2342419 | 9/1977 | France | 92/5 R |
| 3727111 | 2/1989 | Germany | 92/5 R |
| 95202 | 6/1983 | Japan | 324/207.24 |
| 63-97806 | 6/1988 | Japan . | |
| 64-29516 | 2/1989 | Japan . | |
| 64-31207 | 2/1989 | Japan . | |
| 1-178207 | 12/1989 | Japan . | |
| 706540 | 12/1979 | U.S.S.R. | 92/5 R |
| 1465642 | 3/1989 | U.S.S.R. | 92/5 R |

*Primary Examiner*—Tom Noland
*Attorney, Agent, or Firm*—Flynn, Thiel, Boutell & Tanis

[57] ABSTRACT

A device for mounting a position detecting sensor for detecting a stroke of a cylinder. It has such an arrangement that a rotary angle of a magnetic sensor (1) is regulated to within ±5 degrees by a slit (9) formed in a housing (2) mounted thereon with the magnetic sensor (1) and a rotation-locker (7) mounted on a cover (6), the slit (9) allows the housing (2) and the cover (6) to slide on each other, but does not allow the both members to fall off each other, and the cover (6) and a head (4) are aligned with each other by a knock pin (10). With this arrangement, assembling work and highly accurate positioning can be easily performed. Furthermore, according to the present invention, a slit (21) is provided in the top portion of the sensor (1), the position of which can be adjusted by a collar (16) driven thereinto with a pin (17), after the adjusting, the sensor (1) is mechanically pressed by a cover (22) to be fixed or fixed by a mold material, so that an output of the sensor (1) can be controlled to be in an optimal state. Further, a block (20) mounted thereon with the sensor (1) is adjustably installed on a cylinder head (23), the sensor can be set to the position of a magnetic scale with ease, and the sensor (1) and the block (20) can be easily replaced with new ones.

14 Claims, 9 Drawing Sheets

DEVICE FOR MOUNTING POSITION DETECTING SENSOR

TECHNICAL FIELD

The present invention relates to a position detecting sensor of a liquid/pneumatic cylinder for use in making industrial machines, industrial vehicles, etc., unmanned or robotized, and more particularly, to a device for mounting a position detecting sensor for detecting the position of a cylinder having a cylinder rod on which a magnetic scale is formed and a cylinder head on which the sensor is mounted.

BACKGROUND TECHNOLOGY (1) Conventionally, a magnetic sensor is pressed against a piston rod by a spring or it is fixed to a holder or a cover by a pin (e.g. refer to a gazette of Japanese Utility Model Publication No. 63-97806).

In such an arrangement, the magnetic sensor is insufficiently regulated in the rotary direction thereof owing to a play of bolt holes or pin holes of the cover whereby an output and accuracy of the sensor are not improved.

Furthermore, the holder and the cover are likely to fall off by the force of the spring and the assembling thereof was difficult.

Still furthermore, there are such problems in that the position between the magnetic sensor and a spring rod, which causes the deterioration of, the output and accuracy of the sensor, should be regulated sufficiently for the rotary angle of the magnetic sensor so as to stabilize the output and accuracy of the sensor and when a housing and the cover are assembled with the head, the force of the spring acts in the direction to remove the housing and the cover from the head so that the assembling of the housing and the cover aligning with the pin hole is difficult and many steps are required for such an assembling.

(2) In the device of this type, the sensor and the housing are positioned by the pin and the housing and the block are further positioned by another pin. Since the positioning and the mounting angle of the sensor generally affect the output of the signal seriously, the positioning should be performed by way of many pins in the arrangement as set forth above, which causes each measurement error to be accumulated to thereby bring about a large dispersion in the output of the sensor.

(3) Still furthermore, in the device of this type, a block provided with a sensor is mounted on a cylinder head and is adjusted so that the cylinder head is subjected to a tap process aligning with the bolt holes of a block in the site.

There are such other means as disclosed in Japanese Utility Model Laid-Open Publication No. 1-178207 which discloses a fixing means for fixing a sensor by a two-splitted spacer or as disclosed in Japanese Utility Model Laid-Open Publication No. 64-29516 in which a sensor for detecting the movement of a piston rod is mounted on a cylinder head at the portion adjacent to a joint sensor which incorporates a sensor amplifier thereinto for processing an output signal of the sensor.

Such mounting devices have such a drawback in that since the cylinder and the sensor are subjected to the process after they are assembled, the process is difficult and cost high.

In Japanese Utility Model Laid-Open Publication No. 64-29516, since the sensor is mounted on the cylinder head, if the cylinder head is of a screwing type, it is difficult to set the sensor relative to a magnetic scale on the piston rod at a desired position.

Furthermore, since the cylinder head specially serves for mounting the sensor thereon, elements other than the sensor should be replaced and repaired even if the cylinder head is troubled other than the sensor, which causes the problem in maintainability thereof.

It is an object of the present invention to solve the drawbacks or problems as set forth in items (1), (2) and (3).

DISCLOSURE OF THE INVENTION

To achieve the above object, in a position detecting sensor comprising a magnetic scale formed on the surface of a piston rod and a magnetic sensor mounted on a cylinder head relative to the magnetic scale for detecting the position of a liquid/pneumatic cylinder, the magnetic sensor is regulated in the rotary direction thereof so that the rotary angle thereof is regulated to within ±5 degrees by a slit formed in a housing on which the magnetic sensor is mounted and by a rotation-locker mounted on a cover wherein the slit allows the housing and the cover to slide on each other, but does not allow both members to fall off each other, and wherein the cover and a head are aligned with each other by a knock pin.

With such an arrangement, since the housing and the cover are beforehand partially assembled and they are further assembled with the head while being positioned by a head pin, the assembly can be facilitated and troublesome adjusting work can be omitted so that highly accurate positioning can be performed surely with ease.

Furthermore, a slit is provided in a magnetic sensor and a pin embedded in a head is engaged in the slit so as to regulate the magnetic sensor in the rotary direction and a snap ring is mounted on the magnetic sensor so that the magnetic sensor is prevented from falling off the cover by the force of a spring. As a result, highly accurate positioning can be performed with ease by merely assembling these members.

Still furthermore, a slit is provided in the top of the sensor, the position of which can be adjusted by a collar driven thereinto with a pin, and after the adjusting, the sensor is mechanically pressed by the cover so as to be fixed or else may be fixed by a mold material wherein an output signal of the sensor is regulated to be in an optimal state so that the positioning at the optimal position can be performed.

Still furthermore, many taps or bares are provided at the cylinder head at equal intervals on the side the sensor is mounted or alternatively, the bolt holes of the block are made long or elongate so that the block on which the sensor is mounted is provided so as to be adjustable relative to the cylinder head, whereby the assembling is facilitated, the accuracy of the positioning is improved and the sensor and the block can be easily replaced.

BRIEF DESCRIPTION OF THE DRAWINGS

FIGS. 8 to 14 are views showing a fourth embodiment of the present invention in which FIG. 8 is a cross-sectional view of a sensor mounting structure, FIG. 9 shows many tap holes provided on a cylinder head, FIG. 10 is a view showing bolt holes with which tap holes are aligned, FIG. 11 is a front view showing the mounting of a block, FIG. 12 is a view showing tap holes which are formed on the cylinder head, FIG. 13 is a view of long holes of the block and FIG. 14 is a front view showing the mounting of the block.

BEST MODE FOR CARRYING OUT THE INVENTION

Embodiments of the present invention will be described hereinafter with reference to drawings.

Figure 1:
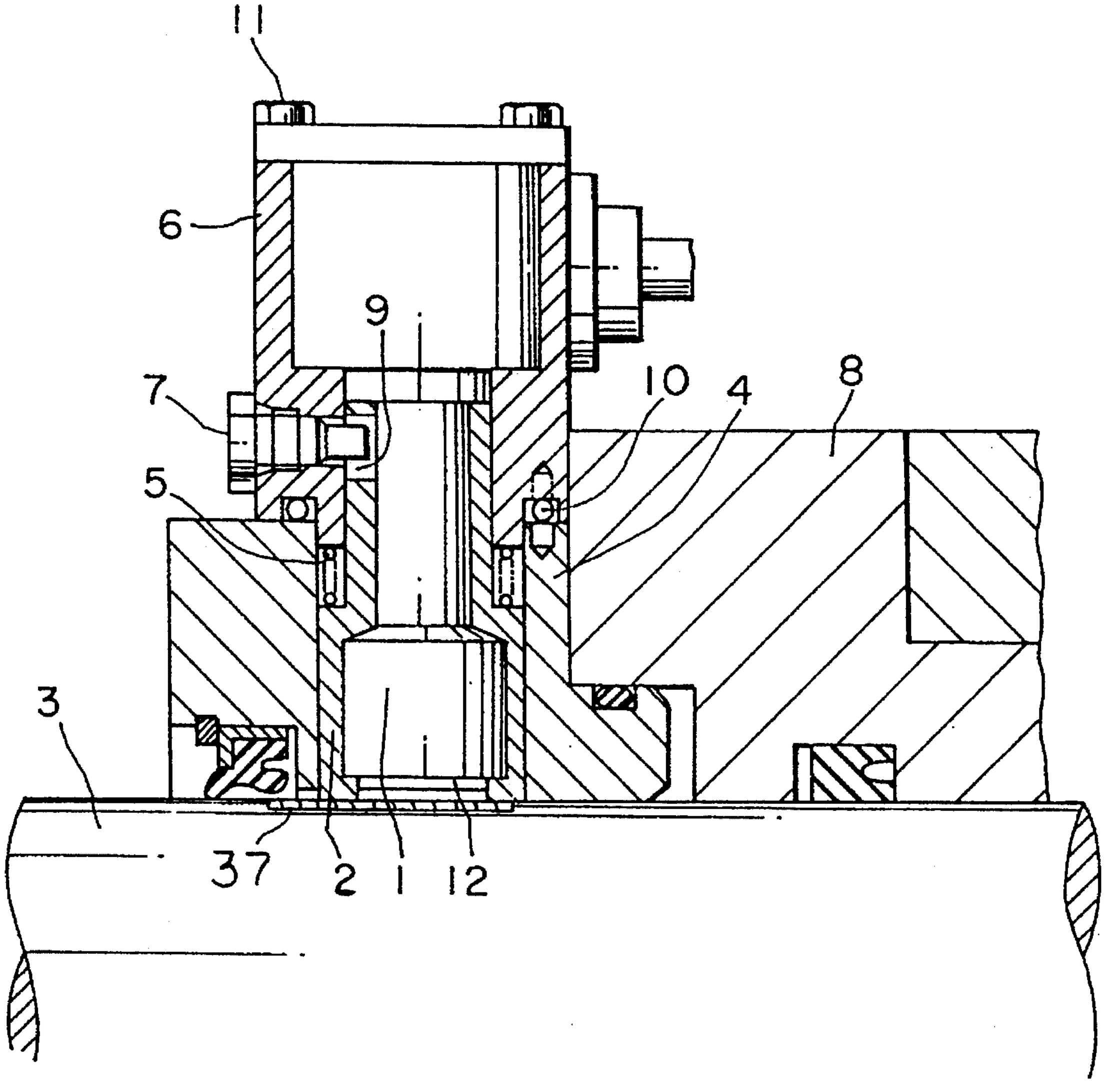
FIG. 1 is a cross-sectional view showing a mounting structure of a position detecting sensor according to a first embodiment.
Figure 2:
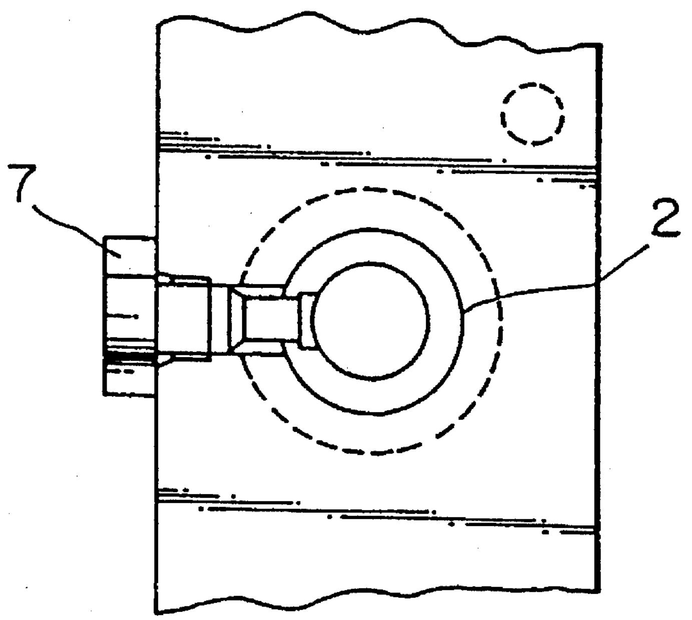
FIGS. 2 and 3 are views explaining the relation between a rotation-locker and a slit in FIG. 1, FIGS. 4 and 5 illustrate respectively a cross-sectional view according to a second embodiment of the present invention and a view explaining the positioning by a pin and the slit.
Figure 3:
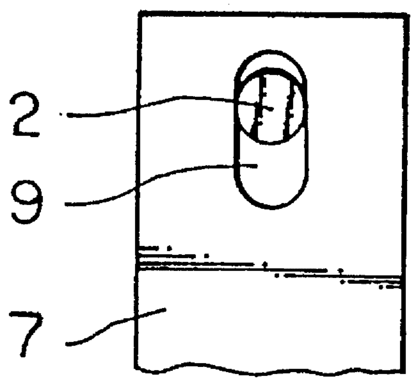

FIGS. 1 to 3 show a first embodiment of the present invention in which denoted at 2 is a housing, 3 is a piston rod, 4 is a head or mounting body, 5 is a spring, 6 is a cover, 7 is a rotation-locker, 8 is a cylinder head, 9 is a slit or slot, 10 is a knock pin and 11 are bolts.

As is evident from the drawings, if the cover 6 and the housing 2 are positioned to the slit 9 of the housing 2 by the rotation-locker 7 and they are connected with each other, the slit 9 is made long or elongate so that the rotation-locker 7 serves as a stopper to prevent the cover 6 and the housing 2 from falling off each other even if the housing 2 is depressed by the spring 5.

Although the housing 2 is not turned by the rotation-locker 7, it can slide vertically wherein a gap between the width of the slit 9 and the diameter at the tip end of the rotation-locker 7 is small so that the rotary angle of the housing 2 is regulated to within ±5 degrees.

Since the cover 6 and the head 4 are positioned by the knock pin 10, the rotary positioning between the piston rod 3 and the housing 2 can be perfect.

Since the rotation-locker 7 positions the housing 2 and the knock pin 10 positions the head 4 and the cover 6, the piston rod 3 and the magnetic sensor 1 are structured so as to be positioned stably.

In the case wherein resolution ranges from 1 to 0.5 mm, the degree of freedom of the positional relation is large while in case that resolution ranges from 0.2 to 0.1 mm, the mounting position and the rotary angle affect the output of the signal seriously so that the positioning is performed by the slit 9 and the rotation-locker 7.

A magnetic scale 37 is formed on the surface of the piston rod 3.

When assembling, the sensor 1, the housing 2, the spring 5, the cover 6, the rotation-locker 7 and the knock pin 10 are partially assembled and the so assembled one structure is merely mounted on the sensor hole of the head 4, which makes the assembly easy.

The head 4 is fixed to the cylinder head 8.

The spring 5 is pressed by the cover 6 and which is fixed to the head 4 by the bolts 11.

The tip end portion of the magnetic sensor 1 is kept constant in the distance between itself and the surface of the piston rod 3 by the housing 2 and the spacer 12.

Figure 4:
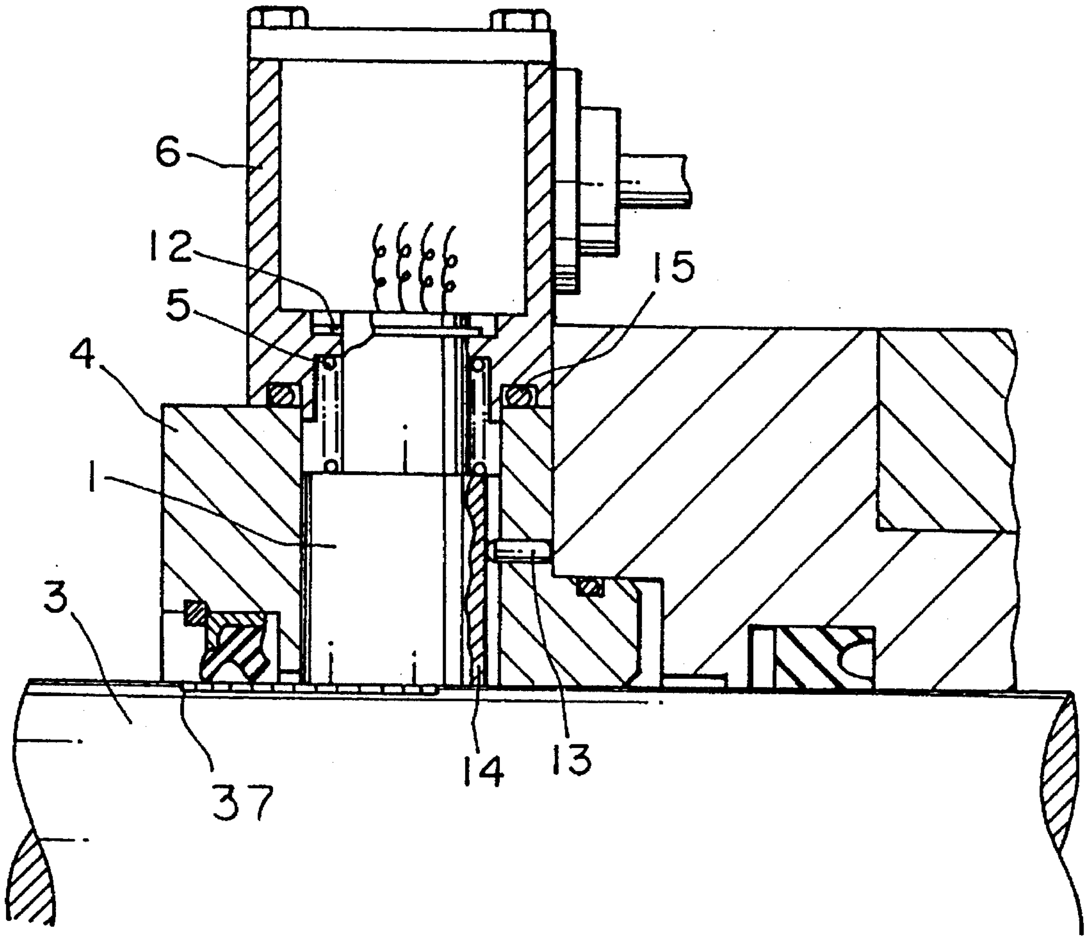
Figure 5:
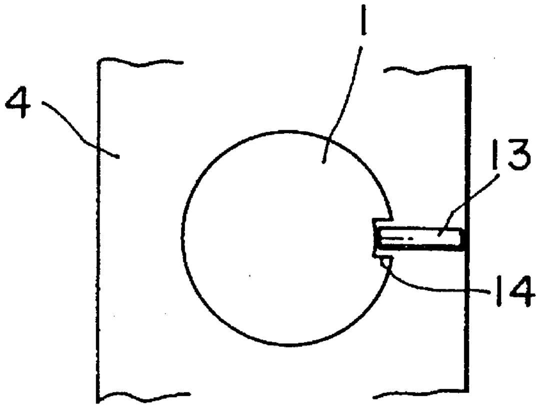

FIGS. 4 and 5 show a second embodiment of the present invention.

If a cover 6 and a magnetic sensor 1 are connected with each other by a snap ring 12, they do not fall off each other even if the magnetic sensor 1 is depressed by a spring 5 since the snap ring 12 serves as a stopper so that a pin 13, which is embedded into the sensor hole of the head 4, is inserted into a slit 14 of the magnetic sensor 1 while the latter is aligned with the former in the case of the assembling thereof.

The magnetic sensor 1, the spring 5, the snap ring 12 and the cover are partially assembled and the so assembled structure one is merely mounted on the sensor hole of the head 4 so that the mounting angle is determined accurately by the pin 13 embedded into the head 4, which makes the assembly easy.

The magnetic sensor 1 is not turned by the pin 13 but is slidable vertically and the gap between the width of a slit 14 and the pin 13 is small so that the rotary angle of the magnetic sensor 1 is regulated to within ±5 degrees.

In the case wherein resolution ranges from 1 to 0.5 mm, the degree of freedom of the positional relation is large while in case that resolution ranges from 0.2 to 0.1 mm, the mounting position and the rotary angle affect the output of the signal seriously so that the positioning is performed by the pin 13 and the slit 14.

A magnetic scale 37 is formed on the surface of the piston rod 3. Denoted at 15 is an O ring.

Figure 6:
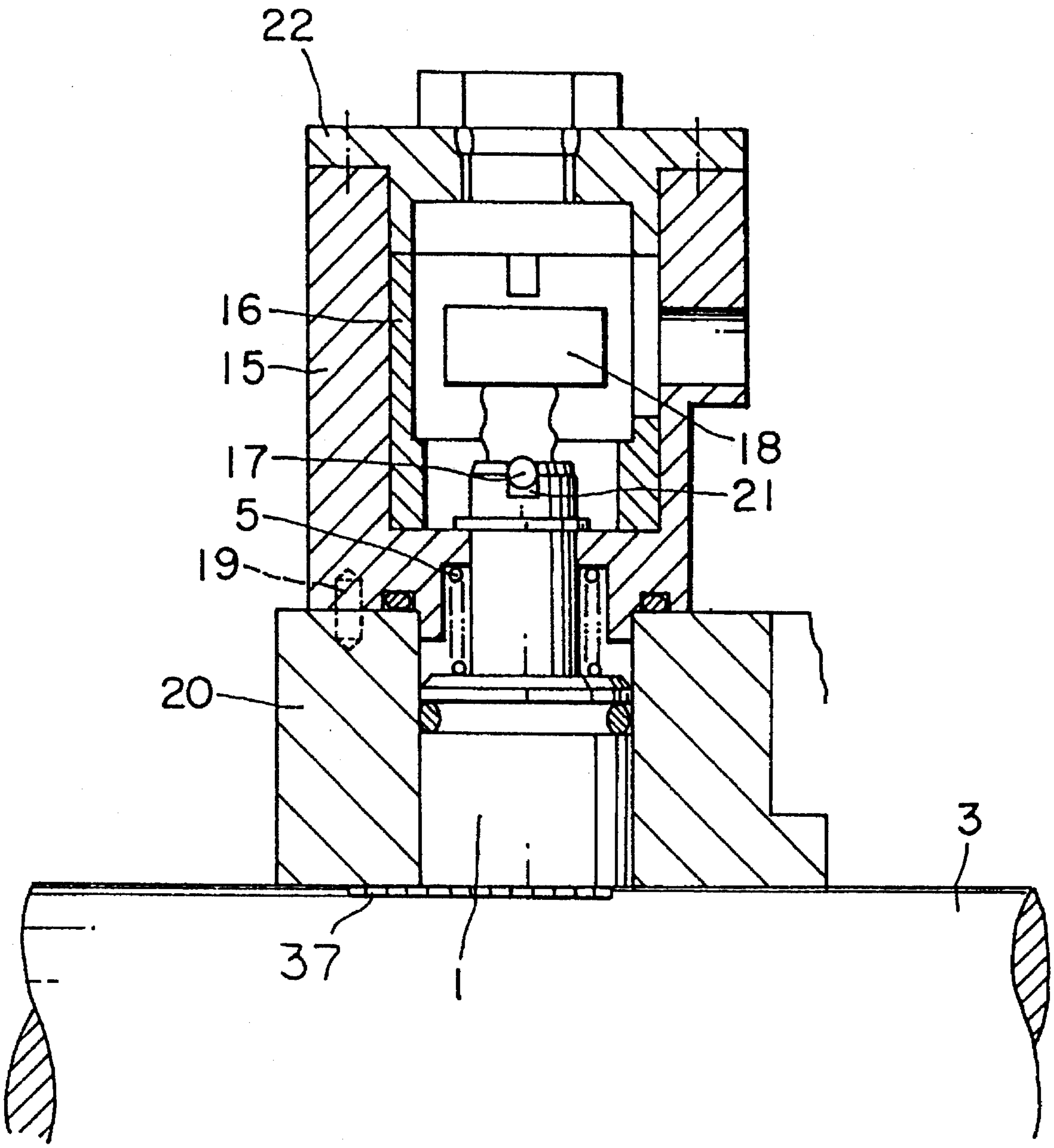
FIGS. 6 and 7 illustrate respectively a cross-sectional view of a third embodiment of the present invention and a view explaining a portion including a positioning pin.
Figure 7:
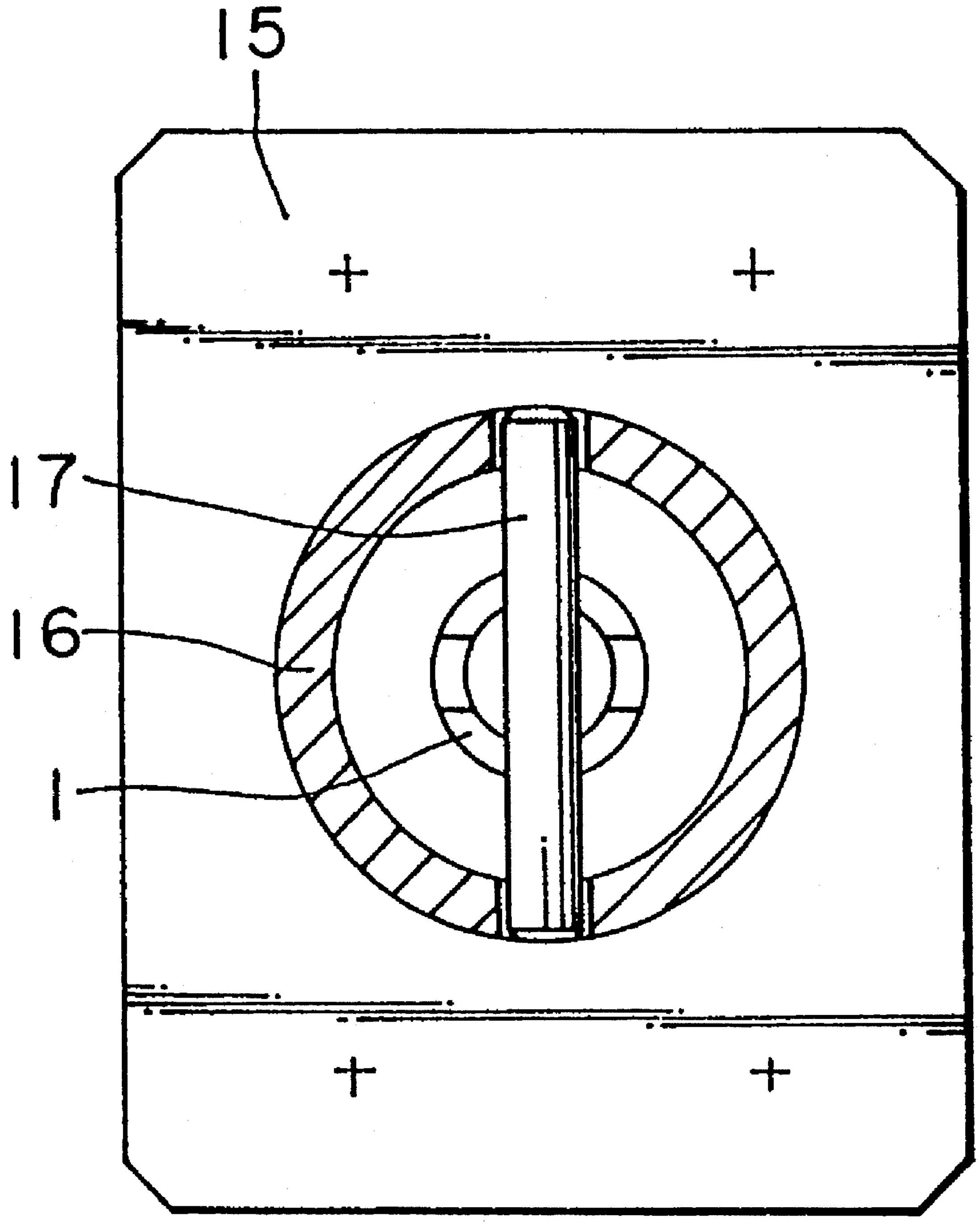

FIGS. 6 and 7 are cross-sectional views showing a third embodiment of the present invention wherein mounted on a housing 15 is the sensor 1 which is arranged so as to be protrudable therefrom by the spring 5, a collar 16, a pin 17 and a substrate 18.

The housing 15 is mounted on a block 20 by a knock pin 19 so as not to be turned while being aligned and assembled with the rod 3 on which a magnetic scale 37 is formed.

The pin 17 driven into the collar 16 is engaged in a slit 21 provided in the top portion of the sensor 1 so that the output signal of the sensor 1 can be adjusted to be in an optimal state by turning the collar 16.

After the adjusting, the collar 16 is pressed by a cover 22 and is fixed. Alternatively, if the collar 16 is filled with a mold material and is fixed, the fixing is further assured.

Figure 8:
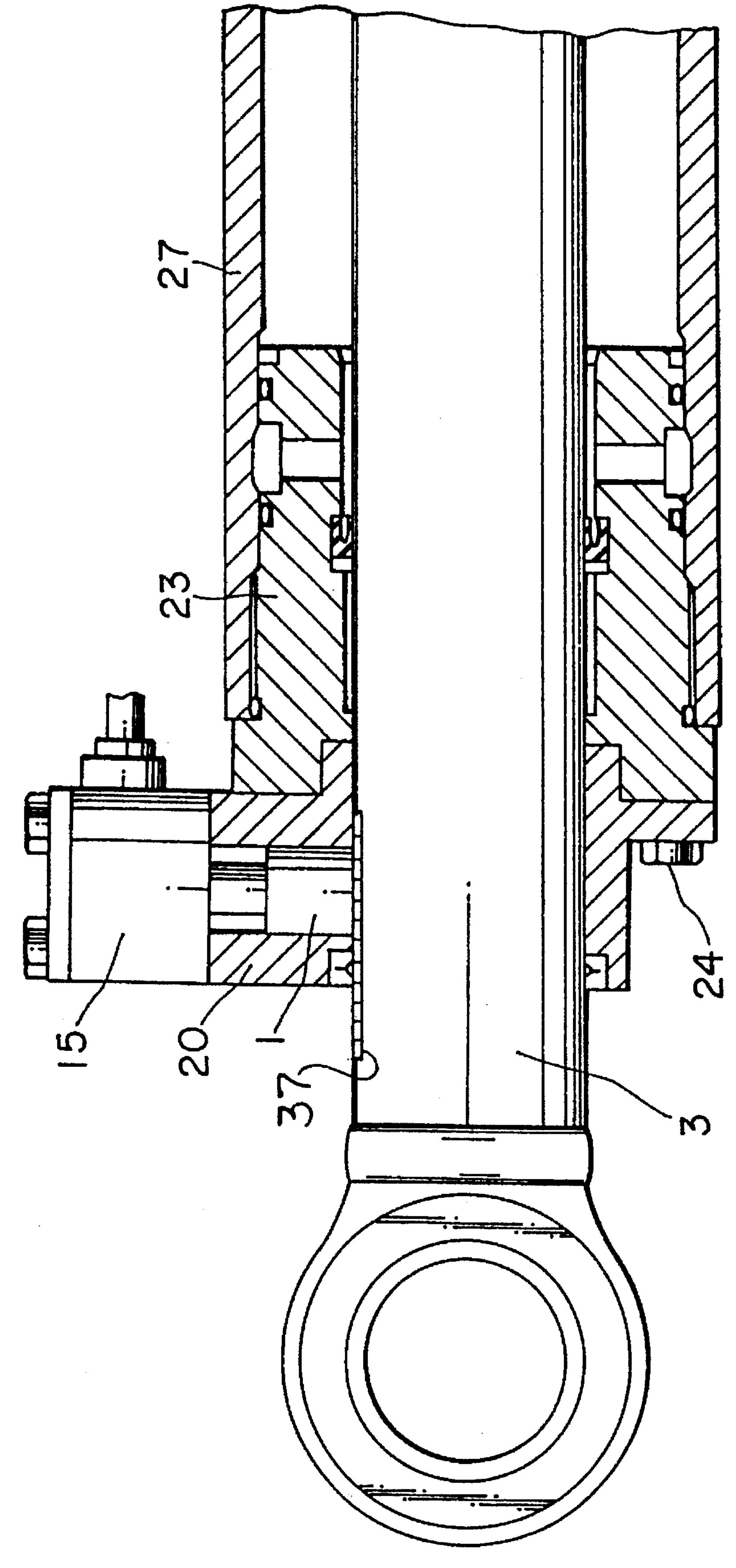

FIG. 8 is a cross-sectional view showing a fourth embodiment of the present invention in which a sensor 1 is fixed to a block 20 by way of a housing 15 and the block 20 is mounted on a cylinder head 23 by bolts 24 and the sensor 1 is assembled so as to detect the magnetic scale 37 of the rod 3.

The housing 15 incorporates a sensor amplifier (not shown) thereinto for processing an output signal of the sensor 1.

Denoted at 27 is a cylinder.

Figure 9:
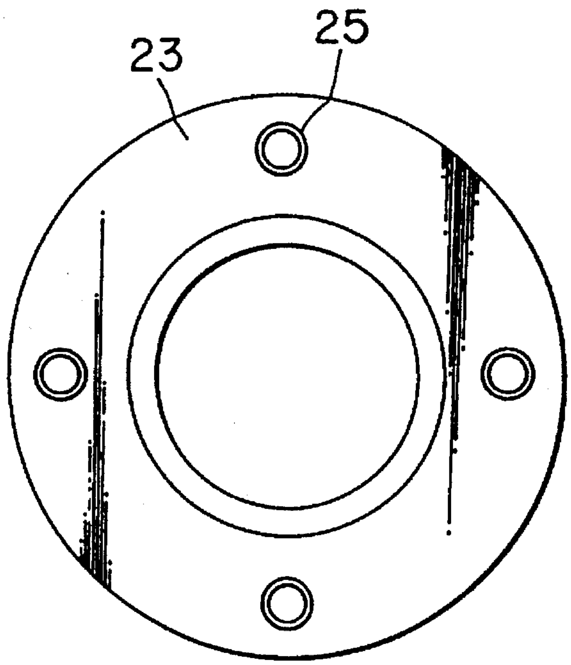
Figure 10:
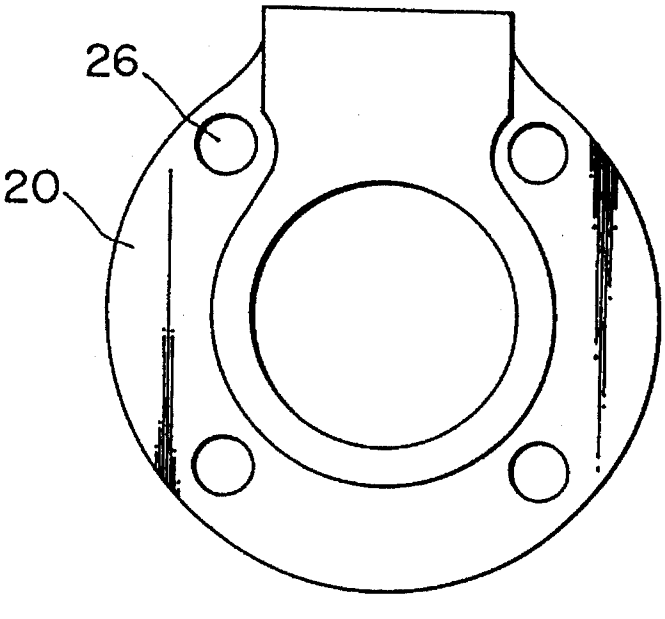

In FIG. 9, four tap holes 25 are formed on the cylinder head 23 at equal intervals, e.g., 90° for mounting the block on the cylinder head 23 and when the block 20 is mounted on the cylinder head 23 by four bolt holes 26 of the block 20, as illustrated in FIG. 10, the relative position of the sensor 1 can be adjusted every 90°.

Figure 11:
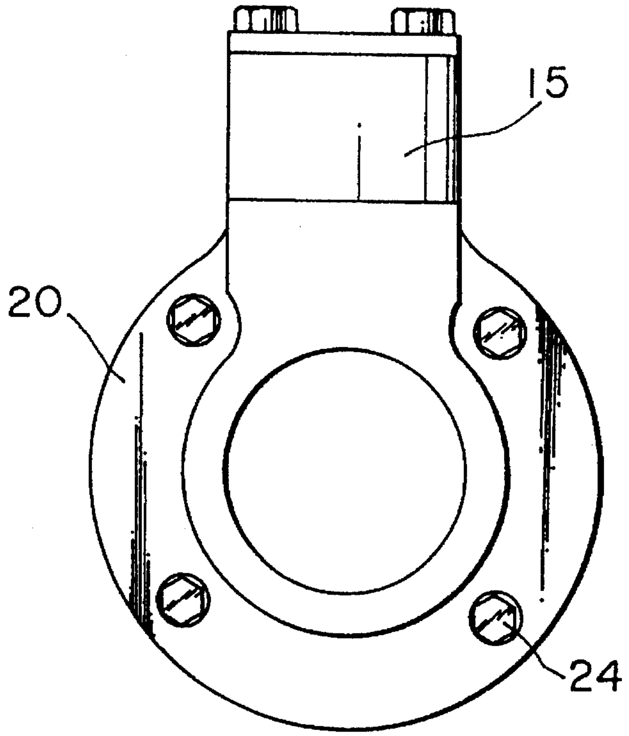

A front view showing the completion of the assembly is illustrated in FIG. 11.

Figure 12:
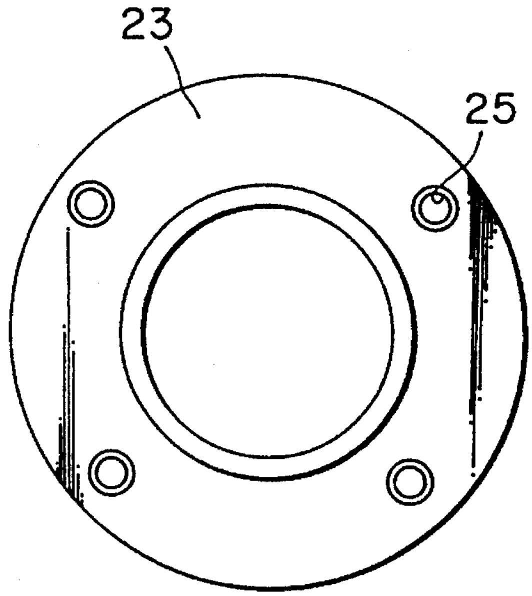
Figure 13:
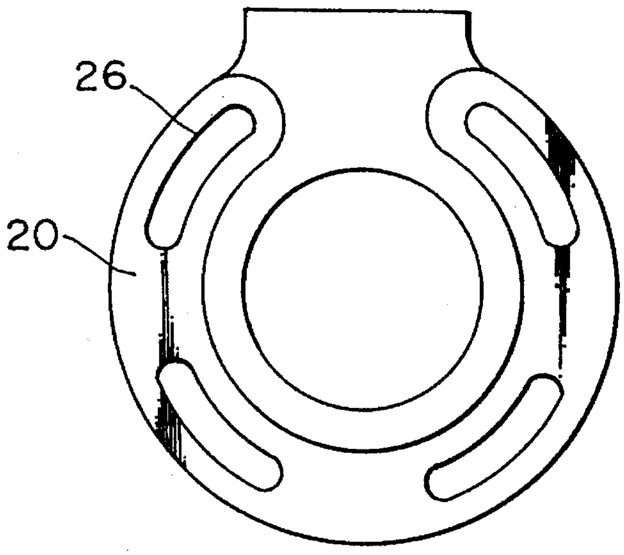

FIG. 12 shows four tap holes 25 which are formed on the cylinder head 23 and through which the block 20 is fixed to the cylinder head 23 wherein bolt holes 26 of the block 20 are long as illustrated in FIG. 13 so that the sensor 1 can be minutely regulated within the regulating range.

Figure 14:
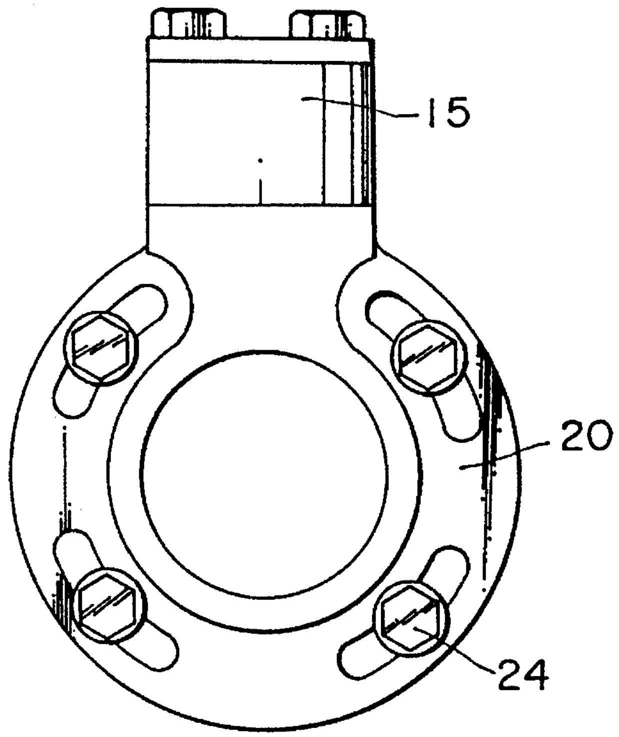

FIG. 14 is a front view showing the completion of mounting of the block 20.

INDUSTRIAL UTILIZATION

The present invention is set forth above in detail and assures the positioning of the magnetic sensor in an inferior environment such as an engineering and construction site, etc. so that the output and accuracy of the sensor are improved to perform the stable function and realize a low cost by the facilitation of assembly.

According to the present invention, the sensor can be positioned in an optimal position for the output signal of the sensor by the turning of the collar and if the sensor is molded, the sensor need not be regulated when the device is disassembled and reassembled so that the stable output signal can be obtained.

Furthermore, according to the present invention, the block having the sensor mounted thereon can be regulated relative to the cylinder head with ease and the position of the magnetic scale can be easily aligned with the position of the sensor so that the sensor can be set in an optimal position and the better output signal can be obtained, which results in the improvement of the efficiency of the mechanical assembly of the device.

Still furthermore, the sensor or the block can be replaced with ease to thereby improve the maintainability thereof.

We claim:

1. In a device for mounting a position detecting sensor for a pressure cylinder, wherein the device comprises a mounting body mounted on a cylinder head and having a cavity formed therein with first and second ends, and a cover for enclosing said first end of the cavity, and wherein the position detecting sensor comprises a magnetic scale formed on an outer surface of a piston rod of the pressure cylinder and a magnetic sensor unit received within the cavity proximate the second end thereof and adjacent to the magnetic scale for detecting a position of the piston rod, comprising the improvement wherein said mounting body and said cover each have a bore formed therein, said bores being aligned one with the other, a first pin member received in both bores to align said mounting body relative to said cover, stop means cooperating with said magnetic sensor unit for preventing the unit from sliding out of said cavity, rotation locking means mounted to said cover and engaged with an elongate slot formed in the magnetic sensor unit to allow the magnetic sensor unit to slide relative to the cover while restraining rotation thereof relative to said mounting body, said rotation locking means and said slot restraining rotational movement of said magnetic sensor body to within ±5 degrees.

2. A device according to claim 1, wherein the slot is formed in a top surface of the magnetic sensor unit, said cover having a cavity opening toward said top surface of said magnetic sensor unit, said rotation locking means comprising a collar disposed within said cavity of said cover having a second pin member oriented so as to slidably seat within said slot, said slot oriented in a rotary position and fixed in said rotary position with said second pin member seated therein and said collar in said cavity of said cover being fixed relative to said cover.

3. A device according to claim 1, wherein said slot is formed in a side surface of said magnetic sensor unit and said rotation locking means comprises a second pin member projecting from said cover and slidably seated within said slot.

4. A device according to claim 1, wherein the mounting body includes a mounting block having attachment means for mounting said mounting block to said cylinder head to orient said magnetic sensor unit in an adjustable position relative to said cylinder head.

5. A device according to claim 4, wherein said mounting block includes an aperture therethrough and said piston rod extends through said aperture.

6. A device according to claim 4, wherein said attachment means comprises apertures provided at equal intervals on the cylinder head, apertures formed through said mounting block and at least one fastener engaging an aligned pair of one of said apertures of said cylinder head and one of said apertures of said mounting block.

7. A device according to claim 6, wherein said apertures in said mounting block are formed elongate.

8. In a device for mounting a position detecting sensor for a pressure cylinder, wherein the device comprises a mounting body mounted on a cylinder head and having a cavity formed therein with first and second ends, and a cover for enclosing said first end of the cavity, and wherein the position detecting sensor comprises a magnetic scale formed on an outer surface of a piston rod of the pressure cylinder and a magnetic sensor unit received within the cavity proximate the second end thereof and adjacent to the magnetic scale for detecting a position of the piston rod, comprising the improvement wherein stop means cooperate with said magnetic sensor unit for preventing the unit from sliding out of said cavity, rotation locking means mounted to said mounting body and engaged with an elongate slot formed in the magnetic sensor unit to allow the magnetic sensor unit to slide relative to the cover while restraining rotation thereof relative to said mounting body, said rotation locking means and said slot restraining rotational movement of said magnetic sensor body to within ±5 degrees.

9. A device according to claim 8, wherein said slot is formed in a side surface of said magnetic sensor unit and said rotation locking means comprises a pin member projecting from said mounting body into said cavity thereof and slidably seated within said slot.

10. A device according to claim 9, wherein said stop means comprises a snap ring disposed about said magnetic sensor unit which projects radially outwardly and abuts against a shoulder in said cover.

11. A device according to claim 9, wherein the mounting body includes a mounting block having attachment means for mounting said mounting block to said cylinder head to orient said magnetic sensor unit in an adjustable position relative to said cylinder head.

12. A device according to claim 11, wherein said mounting block includes an aperture therethrough and said piston rod extends through said aperture.

13. A device according to claim 11, wherein said attachment means comprises apertures provided at equal intervals on the Cylinder head, apertures formed through said mounting block and at least one fastener engaging an aligned pair of one of said apertures of said cylinder head and one of said apertures of said mounting block.

14. A device according to claim 13, wherein said apertures in said mounting block are formed elongate.

* * * * *